United States Patent [19]
Bruder

[11] 3,867,080
[45] Feb. 18, 1975

[54] INJECTION MOLD

[76] Inventor: Robert G. Bruder, 20160 E. Juanita St., Glendora, Calif. 91740

[22] Filed: Oct. 31, 1972

[21] Appl. No.: 302,493

[52] U.S. Cl.............................. 425/247, 425/243
[51] Int. Cl.............................................. B29f 1/022
[58] Field of Search .......... 425/191, 192, 243, 247, 425/250, DIG. 229, 242, 245, 244

[56] References Cited
UNITED STATES PATENTS

| | | | |
|---|---|---|---|
| 3,488,810 | 1/1970 | Gellert................................ | 425/245 |
| 3,492,690 | 2/1970 | Goldring et al................. | 425/242 X |
| 3,520,026 | 7/1970 | Stidham............................ | 425/242 |
| 3,537,139 | 11/1970 | Segmuller...................... | 425/247 X |
| 3,591,897 | 7/1971 | Perras............................. | 425/250 X |
| 3,677,682 | 7/1972 | Putkowski....................... | 425/243 X |

Primary Examiner—Francis S. Husar
Assistant Examiner—David B. Smith
Attorney, Agent, or Firm—Boniard I. Brown

[57] ABSTRACT

An injection mold characterized by relative simplicity, compact size, and capability of relatively high rate production of molded parts without runners which must be removed to finish the parts. A molten molding medium is fed to each mold cavity through a heated hot box and an injection nozzle contained within an injection chamber which communicates with the cavity through a gate opening in the cavity wall. The nozzle has a tip which enters the gate opening to define an annular injection orifice between the nozzle tip and the edge of the gate opening, and the nozzle seats slidably on the hot box to effect self-centering of the nozzle tip in the gate opening and sealing of the nozzle to the hot box by the pressure of the molding medium about the nozzle and heat transfer from the hot box through the nozzle to the medium to retain the latter at the proper molten temperature.

The mold has mold cavities symmetrically arranged at opposite sides of the hot box and intersected by parting planes between mold sections which are separable to permit stripping of the molded articles from the cavities.

16 Claims, 5 Drawing Figures

INJECTION MOLD

BACKGROUND OF THE INVENTION

1. Field of the Invention

This invention relates generally to the injection molding art and more particularly to a novel multiple cavity injection mold.

2. Prior Art

An injection mold is a mold having one or more mold cavities into which a molten molding medium, such as plastic in a hot fluid state, is injected under pressure to fill the cavity. The mold may contain cooling passages through which a cooling medium, such as water, is circulated to accelerate solidifying of the molding medium. The mold includes sections which are separable at a parting plane or parting planes intersecting the mold cavities to permit removal or stripping of the molded parts from each mold cavity. A multiple cavity mold, as the name suggests, is one having a plurality of mold cavities for molding a number of parts at one time.

The existing injection molds have certain deficiencies which this invention overcomes. Prior art multiple parting line molds, for example, have mold cavities interconnected by runner passages through which the molten molding medium flows to the cavities. The resulting molded parts are joined by runners which must be cut off to finish the parts. Accordingly, these molds require a finishing operation which is time consuming and adds to the cost of the finished parts.

Moreover, the existing injection molds have injection nozzles which are firmly attached to the mold body in a manner which complicates and increases the cost of construction of the molds. These injection nozzles must also be individually heated by heating elements incorporated directly in the nozzles. As a consequence, the molds are quite large in size and massive in weight and hence are difficult to handle and require relatively large and massive mold operation for opening and closing the molds. In addition, the central section or sections of a multiple parting line mold are so heavy as to require a relatively complex support arrangement for the sections.

SUMMARY OF THE INVENTION

The injection mold of the present invention has a mold body containing at least one mold cavity intersected by a parting plane between two sections of the body which are separable to remove or strip molded parts from the cavity. A molten molding medium is fed to the mold cavity through a hot box and an injection nozzle. This injection nozzle seats slidably at one end on the hot box and is contained within an injection cavity in the mold body having a gate opening to the cavity. The end of the injection nozzle opposite the hot box has a tip which enters this gate opening to define between the tip and the surrounding edge of the opening an annular injection orifice opening to the cavity.

The molten molding medium flows to the mold cavity through an infeed passage extending through the hot box, then through a passage in the nozzle which opens laterally into the injection chamber, and finally through the chamber and injection orifice into the mold cavity. According to a feature of the invention, the pressure of the medium in the injection chamber effects both self centering of the nozzle tip in the gate opening to maintain a true and precise injection annulus during thermal expansion and contraction of the nozzle and mold body and sealing of the nozzle ring to the hot box. According to another feature of the invention, the nozzle is constructed of a metal with high thermal conductivity. The nozzle conducts heat from the hot box to the nozzle tip for heating the molding medium as it flows through the injection chamber and annulus into the mold cavity for maintaining the medium at the proper molding temperature.

The described injection mold of the invention is a multiple cavity and parting line mold. This mold has mold cavities and associated injection nozzles and chambers symmetrically arranged at opposite sides of the hot box. This symmetrical arrangement in combination with the self centering and heating nozzle arrangement provides a multiple parting line mold in which the center mold section containing the hot box and nozzles is relatively small and light weight and is supported by simple guide pins. The resulting mold is relatively compact, easy to handle, and has a substantially increased production rate.

DESCRIPTION OF THE PREFERRED EMBODIMENT

Figure 1:
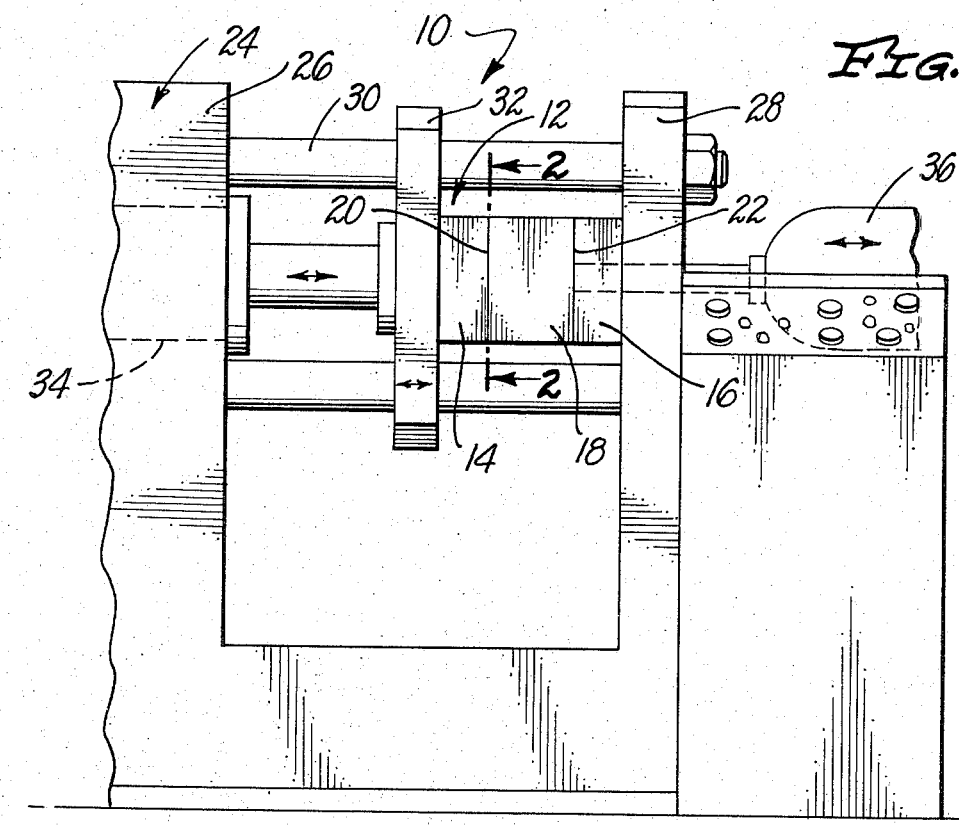
FIG. 1 is a side elevation of an injection molding machine embodying an injection mold according to the invention.
Figure 2:
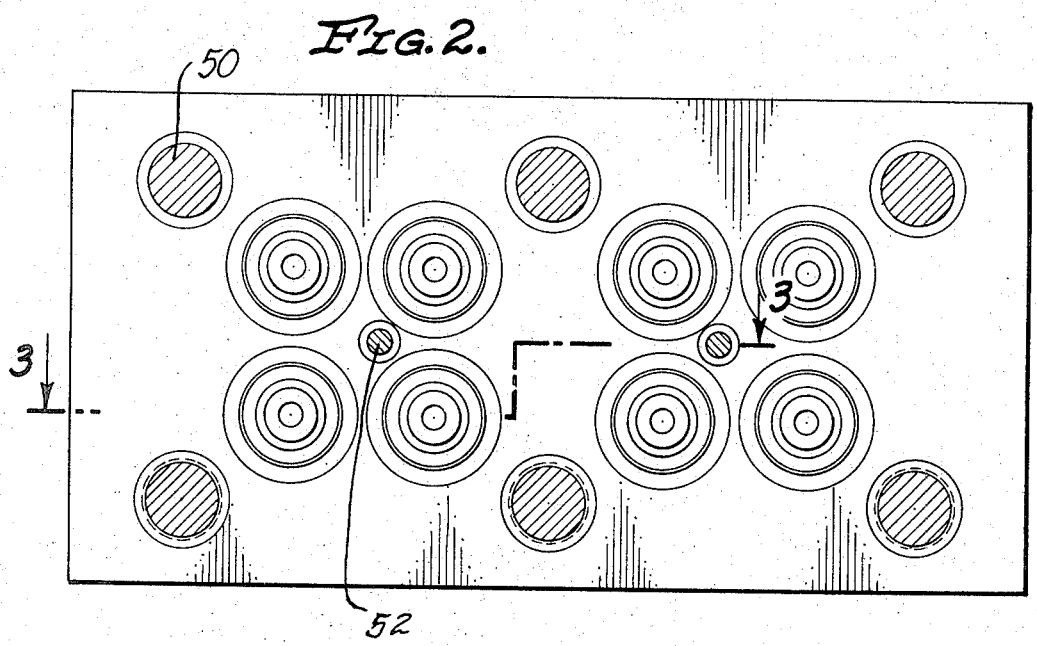
FIG. 2 is an enlarged section taken on line 2—2 in FIG. 1.
Figure 3:
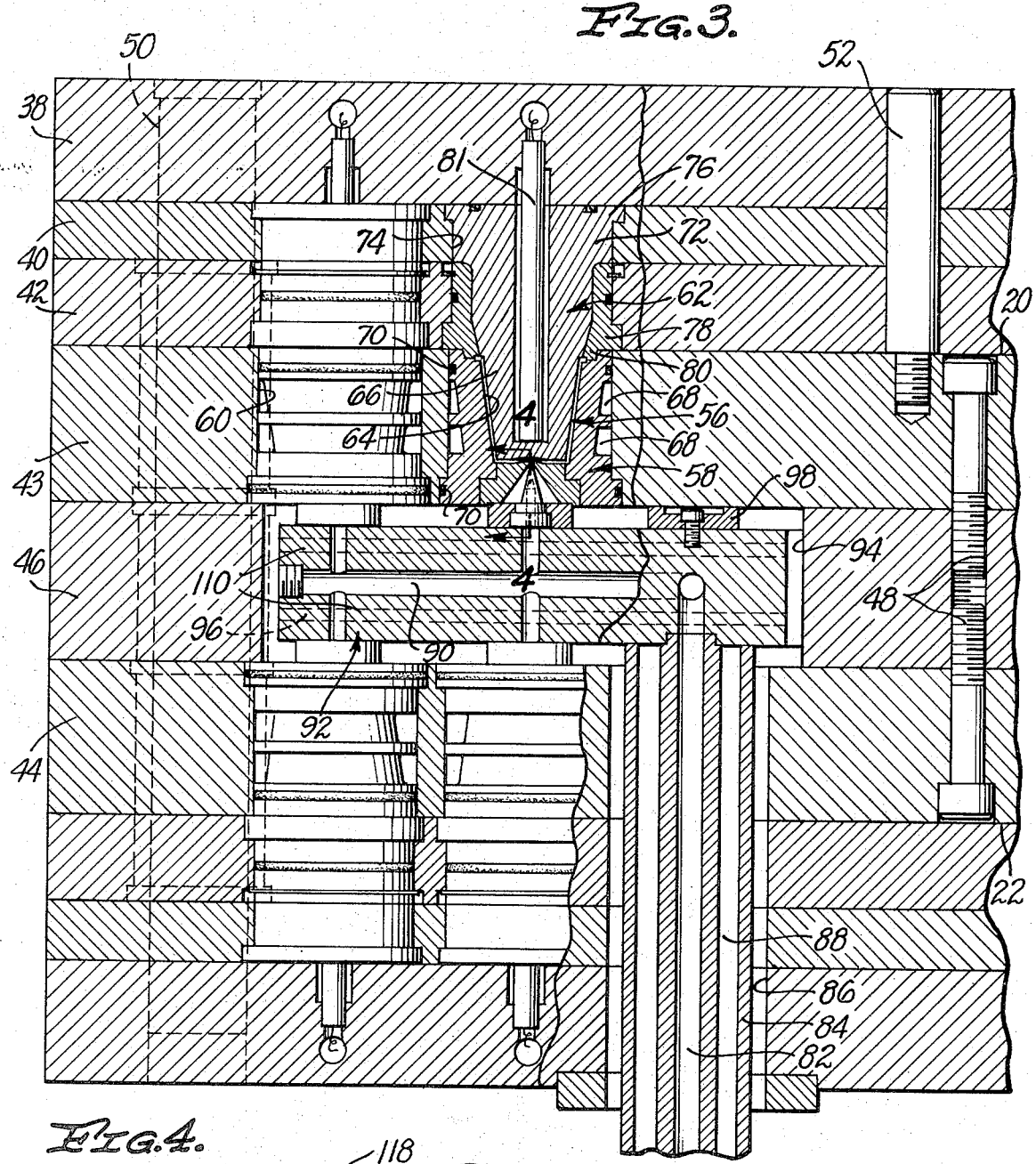
FIG. 3 is an enlarged section taken on line 3—3 in FIG. 2.
Figure 4:
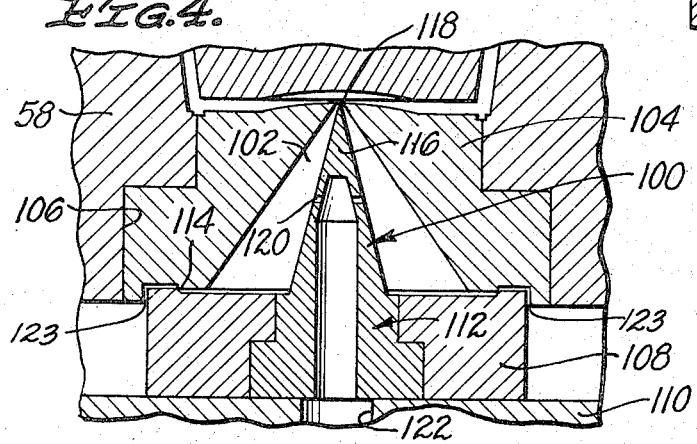
FIG. 4 is an enlarged section taken on line 4—4 in FIG. 3.
Figure 5:
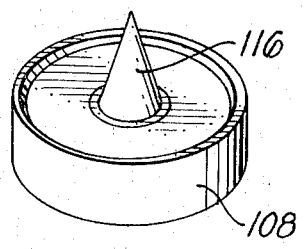
FIG. 5 is a perspective view of the injection nozzle.

FIG. 1 illustrates an injection molding machine 10 embodying a multiple parting line injection mold 12 according to the invention. Mold 12 has a mold body with two outer sections 14 and 16 and a center section 18 which separate at parting planes 20 and 22.

Molding machine 10 has a frame 24 with a spaced head 26 and bolster 28 interconnected by horizontal bearing shafts 30. Slidably supported on the bearing shafts 30 is a ram head 32 which is movable back and forth along the shafts by a hydraulic ram 36 mounted in the frame head 26.

Injection mold 12 is located between the bolster 28 and ram head 32 with its parting planes 20, 22 vertical. The two outer mold sections 14, 16 are bolted to the ram head and bolster, respectively, and are connected to the center mold section 18 in a manner to be described presently. The ram 34 is operable to move the mold sections 14, 16, 18 toward one another to their closed molding positions of FIG. 1 and away from one another to open positions wherein the sections are separated to permit removal or stripping of mold parts from the mold.

A molten molding medium is supplied to the mold 12 by a pump 36. This molten medium is injected into the mold cavities in the manner explained later with the mold sections 14, 16, 18 closed, as in FIG. 1. The plastic in the mold cavities is then chilled, after which mold sections are opened and the finished molded parts are stripped from the mold cavities.

Turning now to FIGS. 2—5, the two outer mold sections 14, 16 are identical in most respects. Each outer section includes outer and center plates 38, 40 which are joined to one another by means not shown and an inner stripper plate 42 which is movable toward and away from the center plate 40. The center mold section 18 includes two outer plates 43, 44 and a center plate 46. Plates 43, 44, 46 are firmly joined to one another by bolts 48.

Mold sections 14, 16, 18 are interconnected for relative movement between their open and closed positions by guide pins 50. Additional guide pins 52 secured to the center mold section 18 slide in the plates 38, 40, 42 of the outer mold sections 14, 16 to guide the stripper plates 42 in their movement toward and away from the plates 40. As noted earlier, the mold sections 14, 16, 18 separate at the parting planes 20, 22.

The center mold section 18 contains mold cavities 56 which, in this case, are shaped to produce plastic tumblers. Mold cavities 56 are defined by cavity sleeves 58 fixed in openings 60 in the outer plates 43, 44 of the center mold section 18 and cores 62 fixed to the outer and center plates 38, 40 of the outer mold sections 14, 16. Each cavity sleeve 58 has a tapered longitudinal opening 64 into which a tapered tip 66 of the corresponding core 62 extends when the mold sections are closed. The cavity sleeve opening 64 and core tip 66 are sized to define therebetween a narrow conical annulus forming the mold cavity 56.

Each cavity sleeve 58 has outer grooves 68 which form with the surrounding wall of the corresponding plate opening 60 water passages communicating with a supply of cooling water (not shown). The sleeves are sealed to the opening walls by seal rings 70. Each core 62 has a base end 72 extending through an opening 74 in the center plate 40 of the corresponding outer mold section 14, 16. This core end is surrounded by a flange 76 which is clamped between the plates 38, 40 to secure the core firmly to the mold section. Between its conical tip 66 and base end 72, each core has a cylindrical section on which is slidable a stripper sleeve 78 fixed within an opening in the corresponding stripper plate 42. This stripper sleeve has an internally tapered end which extends over the conical tip of the core to provide an annular stripping shoulder 80. Extending axially through each core is a heating element 81.

As noted earlier, a molten molding medium is supplied to the mold 12 by the pump 36. The medium enters the mold through an infeed passage 82 within a conduit 84 extending through the mold sections 16, 18. Conduit 84 is surrounded by a conduit 86 containing a heater 88 for heating the medium. Infeed passage 82 opens to a passage 90 extending through a hot box 92. This hot box is contained within an opening 94 in the center plate 46 of the center mold section 18 and is heated by heating elements 96 in the box walls. The hot box is positioned in the opening 94 by spacers 98.

The molten medium flows from the hot box 92 into the mold cavities 56 through injection nozzles 100. Each injection nozzle is contained within an injection or nozzle chamber 102 in an insert 104 fixed within an opening 106 in the inner end of the respective cavity sleeve 58. Each nozzle has a nozzle ring 108 seating slidably against the adjacent wall 110 of the hot box 92 and a nozzle body 112 extending through the ring with a friction fit and also seating against the hot box wall. The upper end of the nozzle ring 108, as viewed in FIG. 4 engages in a cavity bore recess 114 in the adjacent end of the nozzle chamber insert 104.

The nozzle body 112 has a tapered tip 116 which extrudes through the nozzle chamber 102 to the end of the chamber adjacent the mold cavity 56. This end of the chamber opens to the mold cavity through a gate opening 118 in the cavity wall. The pointed end of the nozzle tip enters the gate opening to define between the tip and the surrounding edge of the opening an annular injection orifice opening to the mold cavity. The wall of the nozzle chamber 102 is conically tapered at a larger angle than the nozzle tip, such that the chamber converges toward the injection orifice.

Extending through each injection nozzle 100 is a passage which opens laterally to the nozzle chamber 102 through ports 120 in the nozzle tip 116. The nozzle passage opens to the hot box passage 90 through ports 122 in the hot box wall 110. During molding operation, the molten molding medium flows from the hot box 92 through the injection nozzles 100 into the nozzle chambers 102 and then from these chambers through the injection annuli 118 into the mold cavities 56. Sufficient clearance 123 is provided between the nozzle rings 108 and the walls of their cavity sleeve recesses 114 to permit the pressure of the molten medium flowing through the nozzle chambers 102 to constantly center the nozzle tips on their gate openings 118 and thereby maintain true and precise injection annuli during thermal expansion and contraction of the mold. In this connection, it will be recalled that the nozzles seat slidably against the hot box and thus can move slightly to permit self centering of the nozzles by the pressure of the molding medium as described. The pressure in the chambers also acts on the nozzle rings 108 to urge the nozzles against the hot box walls 110 and seal the nozzles to the hot box.

According to another feature of the invention, the nozzles 100 are constructed of a metal with high thermal conductivity to conduct heat from the hot box 92 to the nozzle tips 116 for heating the molding medium in the nozzle chambers 102 and injection annuli 118 to maintain the medium at the proper molding temperature.

During each molding cycle, the mold sections 14, 16, 18 are closed and a molten molding medium, in this case plastic, is injected into the mold cavities 56. As described earlier, the injection nozzles 100 are self-centered in the gate openings 118 by the pressure of the medium to maintain true and precise injection annuli between the nozzle tips 116 and the edges of the gate openings. The pressure of the medium also maintains the nozzles in sealing contact with the hot box 92. The molten plastic in the mold cavities 56 is then chilled to a solid state by passing cooling water through the water passages 68. Finally, the mold sections 14, 16, 18 are opened and the molded parts, which adhere to the mold cores 62, are stripped from the cores by moving the stripper plates 42 along the core tips 66. The stripper plates are thus moved by rods (not shown) attached to the plates and extending through the mold sections 14, 16.

I claim:

1. An injection mold comprising:
   a mold body containing a mold cavity and a nozzle chamber opening at one end into said cavity through a gate opening in the cavity wall and including separable mold body sections movable relative to one another between closed positions for molding a part in said cavity and open positions for removing the molded part from the cavity and having a parting plane intersecting said cavity, an injection nozzle in said chamber having a tip positioned within and smaller in diameter than said gate opening so as to define an annular injection orifice between said tip and the edge of said gate opening, said nozzle containing passages opening to said chamber through which a molten molding medium is adapted to be injected into said chamber, said molding medium flowing from said chamber into said mold cavity through said annular orifice, and means movably supporting said nozzle on one mold body section for relatively free centering movement of the nozzle laterally of the axis of said gate opening by the pressure of the molding medium passing through said orifice to permit centering of said nozzle tip in said gate opening by said molding medium.

2. An injection mold according to claim 1 wherein:
said nozzle includes a nozzle body extending axially through said chamber and terminating at one end in said nozzle tip, and
said chamber and nozzle body are conically tapered to a decreasing diameter in the direction of said gate opening.

3. An injection mold according to claim 2 wherein:
said chamber and nozzle body have different taper angles, such that the cross-sectional area of the annular chamber space between the nozzle body and the chamber wall decreases in the direction of said gate opening.

4. An injection mold according to claim 1 wherein:
said nozzle supporting means comprises a wall member extending across the opposite end of said chamber and slidably seating the opposite end of said nozzle for self-centering movement of the latter laterally of said gate opening axis.

5. An injection mold according to claim 4 wherein:
said nozzle includes a nozzle body extending axially through said chamber and terminating at one end in said nozzle tip and a nozzle ring surrounding the opposite end of said nozzle body and slidably seating on said wall member, and
said nozzle passages include a passage extending axially through said nozzle body and communicating with a passage in said wall member through which said molding medium enters said nozzle body, and injection ports opening laterally through the wall of said nozzle body into said chamber.

6. An injection mold according to claim 5 wherein;
said nozzle includes a nozzle body extending axially through said chamber and terminating at one end in said nozzle tip, and
said chamber and nozzle body are conically tapered to a decreasing diameter in the direction of said gate opening.

7. An injection mold according to claim 6 wherein:
said chamber and nozzle body have different taper angles, such that the cross-sectional area of the annular chamber space between the nozzle body and the chamber wall decreases in the direction of said gate opening.

8. An injection mold according to claim 7 including:
an infeed hot box within said mold body which furnishes said nozzle supporting wall member and contains an infeed passage communicating with said wall member passage through which said molding medium flows to said nozzle,
means for heating said hot box, and
said nozzle member is constructed of a material having high thermal conductivity.

9. An injection mold according to claim 1 wherein:
said nozzle supporting means comprises an infeed hot box in said mold body having a wall member extending across the opposite end of said chamber and slidably seating the opposite end of said nozzle for self-centering movement of the nozzle laterally of said gate opening axis, and an infeed passage opening through said wall member to said nozzle passages through which said molding medium is fed to said nozzle,
means for heating said hot box, and
said nozzle is constructed of a material having high thermal conductivity.

10. An injection mold according to claim 9 including:
a second mold cavity intersected by said parting plane and communicating nozzle chamber in said mold body spaced along said hot box from said first mentioned cavity and chamber,
a second injection nozzle in said second chamber having a tip positioned within the gate opening communicating said second cavity and chamber and slidably seating against said wall member for self-centering movement of said second nozzle in said latter gate opening, and passages in said second nozzle communicating with said hot box infeed passage and opening to said second chamber.

11. An injection mold according to claim 10 wherein:
each of said nozzles includes a nozzle body extending axially through the corresponding nozzle chamber and terminating at one end in the respective nozzle tip, and
each chamber and nozzle body are conically tapered to a decreasing diameter in the direction of the respective gate opening.

12. An injection mold according to claim 11 wherein:
each chamber and nozzle body have different taper angles, such that the cross-sectional view of the annular chamber space between the nozzle body and the chamber wall decreases in the direction of said gate opening.

13. An injection mold according to claim 1 wherein:
said nozzle supporting means comprises an infeed hot box in said mold body having a wall member extending across the opposite end of said chamber and slidably seating the opposite end of said nozzle for self-centering movement of the nozzle laterally of said gate opening axis, and an infeed passage opening through said wall member to said nozzle passages through which said molding medium is fed to said nozzle, a second mold cavity at the side of said hot box opposite said first mentioned cavity, a second nozzle chamber between said second cavity and hot box opening at one end to said second cavity through a second gate opening in the cavity wall and opening at its other end toward the adjacent wall member of said hot box, a second injection nozzle in said second chamber having a tip at one end positioned within and smaller in diameter than said second gate opening so as to define a second annular injection orifice between the latter tip and the edge of said second gate opening, and passage opening to said second chamber through which said molding medium is adapted to be injected into said second chamber, said molding medium flowing from said second chamber into said second mold cavity through said second annular orifice to effect self-centering of said second nozzle tip in said second gate opening, the opposite end of said second nozzle seating slidably on said adjacent hot box wall member for self centering movement of said second nozzle laterally of the axis of said second gate opening, means for heating said hot box, said nozzles are constructed of a material having high thermal conductivity, and said mold body includes separable mold body sections having a parting plane parallel to said first parting plane and intersecting said second cavity.

14. An injection mold according to claim 13 wherein:

each of said nozzles includes a nozzle body extending axially through the corresponding nozzle chamber and terminating at one end in the respective nozzle tip, and each chamber and nozzle body are conically tapered to a decreasing diameter in the direction of the respective gate opening.

15. An injection mold according to claim 14 wherein:

each chamber and nozzle body have different taper angles, such that the cross-sectional view of the annular chamber space between the nozzle body and the chamber wall decreases in the direction of said gate opening.

16. An injection mold comprising:

a mold body containing a mold cavity and a nozzle chamber opening at one end into said cavity through a gate opening in the cavity wall and including separable mold body sections having a parting plane intersecting said cavity, an injection nozzle in said chamber having a tip positioned within and smaller in diameter than said gate opening so as to define an annular injection orifice between said tip and the edge of said gate opening, said nozzle containing passages opening to said chamber through which a molten molding medium is adapted to be injected into said chamber, whereby said molding medium flows from said chamber into said cavity through said orifice, a hot box extending across the opposite end of said chamber and slidably seating the opposite end of said nozzle for relatively free centering movement of said nozzle laterally of the axis of said gate opening by the pressure of the molding medium flowing through said orifice to permit centering of said nozzle tip in said gate opening by said molding medium, said hot box containing an infeed passage communicating with said nozzle passage through which said molding medium is fed to said nozzle passages, means for heating said hot box, and said nozzle being constructed of a material having a relatively high thermal conductivity.

* * * * *